UNITED STATES PATENT OFFICE.

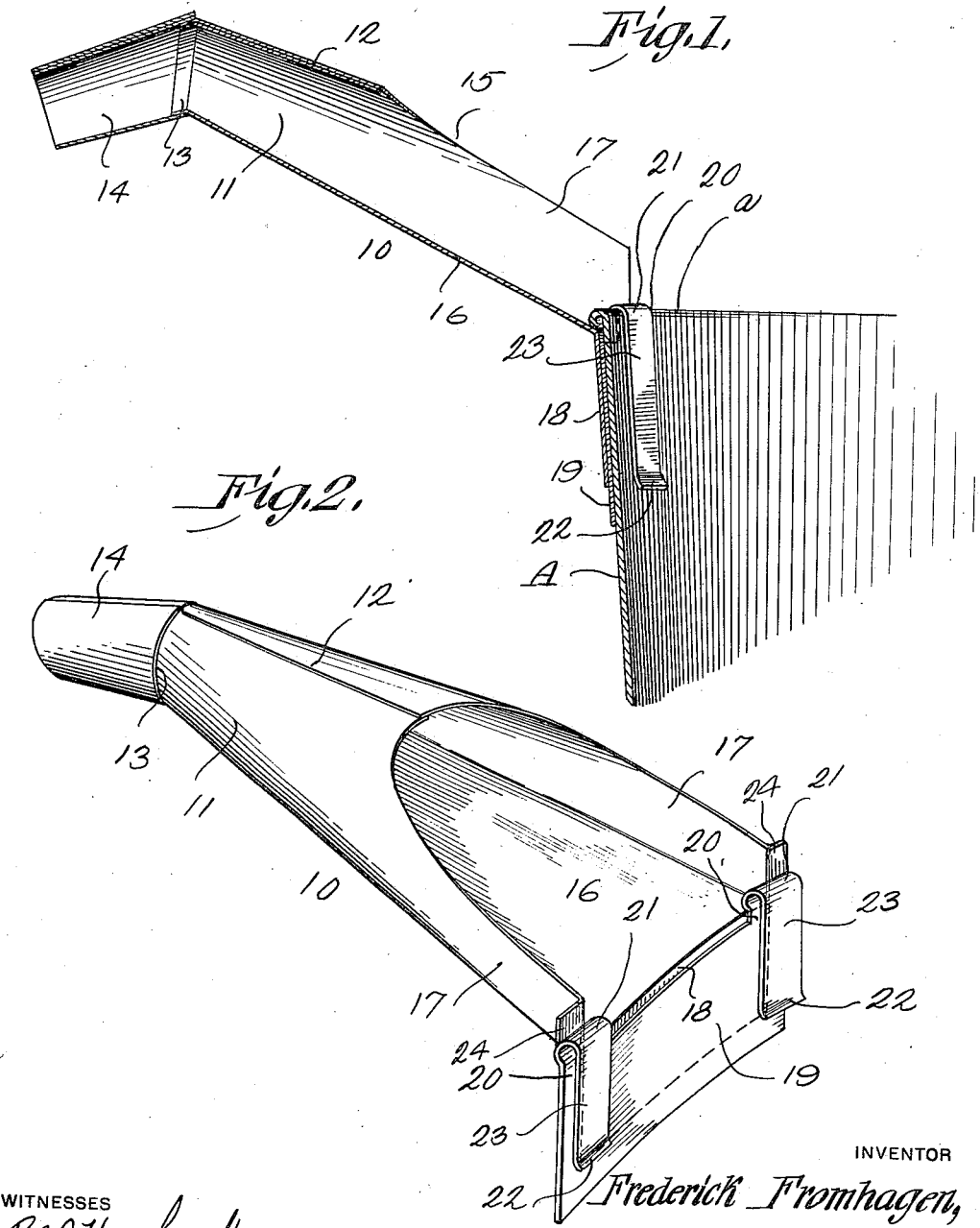

FREDERICK FROMHAGEN, OF BROOKLYN, NEW YORK.

ATTACHABLE SPOUT FOR VESSELS.

1,298,031.

Specification of Letters Patent. Patented Mar. 25, 1919.

Application filed April 10, 1918. Serial No. 227,715.

*To all whom it may concern:*

Be it known that I, FREDERICK FROMHAGEN, a citizen of the United States, residing at Brooklyn, in the county of Kings and State of New York, have invented certain new and useful Improvements in Attachable Spouts for Vessels, of which the following is a specification.

This invention relates to an attachable spout for pails and other containers and has for its main object to provide a simple and cheap article which may be quickly and securely attached to and detached from a pail and like container for guiding the flow of liquid when the latter is poured from the container, and so prevent splashing and loss of the contents of the pail while being transferred to one or more other vessels.

A further object of the invention is to provide a funnel-like spout for containers which may be detachably mounted on the rim thereof for directing the flow of the contents while being poured therefrom and which spout may be used with pails and containers of various diameters and be held in place by a resilient holding means integral with the spout which enables the user to quickly apply the same when needed and as quickly remove it from the container when its services are no longer wanted.

With these objects in view, together with others which will appear as the description proceeds, the invention resides in the novel formation, combination, and arrangement of parts, all as will be described more fully hereinafter, illustrated in the drawings, and particulary pointed out in the claim.

In the accompanying drawings:—

Figure 1 is a vertical, longitudinal sectional view of the spout in position for use on the edge of a pail or other container, and Fig. 2 is a perspective view of the spout detached.

In the drawing, 10 indicates the spout made of a blank of sheet metal cut to the desired shape and folded as shown in Fig. 2. The outer end of the spout 10 is folded into tubular form as shown at 11, the edges of the blank being overlapped as at 12 and soldered or otherwise secured together. The outer tubular portion of the spout 10 may terminate at 13 with a circular opening to direct the course of liquid flowing through the spout, or if desired, an extension 14 of any suitable length may be fitted over the terminal 13 of the spout and preferably inclined downwardly at its outer end as shown in the drawing. By the use of this extension the flow of liquid from the spout is easily guided and directed and by making the outlet end of the extension of proper diameter, the liquid may be poured without trouble into jars and bottles.

The spout 10 tapers laterally from its outer end 13 to its opposite attaching end, the spout preferably being open or uncovered at its rear as shown at 15 and having a somewhat flat transversely horizontal bottom 16 from which rises two upstanding sides 17. The width of the spout is such that when in place on a pail and the latter turned to empty the contents thereof, the spout will receive all the liquid flowing from the pail without danger of any pouring over the sides or splashing from the spout and so become wasted.

At its inner end the bottom 16 of the spout 10 is bent downwardly to form a substantially vertical flange 18 that has a slight horizontal curve to conform more or less to the external curvature of a pail or container such as A to which the spout may be applied. Against the inner side of the flange 18 is placed a plate 19, secured to said flange by soldering or otherwise and extending below the bottom edge of the flange and also laterally beyond the side edges thereof. This plate provides a bearing surface to fit snugly against the outer surface of the container A and prevent liquids as they are poured from the container from flowing downwardly between the spout and the container.

The plate 19 is made of a more or less resilient metal and has a securing finger 20 on its top edge at each end. Each finger on its top edge at each end. Each finger 20 is bent upon itself immediately above the plate 19 to form a loop 21, the fingers then continuing downwardly substantially parallel to the plate 19 nearly to or if necessary, below its lower edge. The lower ends of the fingers are given a slight bend away from the plate, as at 22 to enable the depending resilient portions 23 of the fingers to engage over the upper edge *a* of the container A. The sides 17 of the spout at their inner terminals are bent outwardly to form angular lugs 24 against which the upright portions of the fingers 20 bear and to which said fingers are soldered, thus giving them additional support and rigidity and lessen the danger of breaking from the plate 19 by rough handling when applying the spout to and removing it from a container. The lugs 24 also brace the sides 17 and direct the outflowing liquid into the spout.

In positioning the spout on a pail or other container, the spout is held as shown in Fig. 2 with the lower edge of the plate 19 against the outer side of the container and the free ends of the spring portions 23 of the fingers 20 just above the top edge $a$ of the container. Upon pushing the spout downwardly, the spring fingers pass over the edge $a$ and within the container, pressing against its inner side and so holding the plate against the outer side with the bottom 16 of the spout just below the edge $a$ of the container. In this position the spout is ready for use and will readily guide the outflow of the contents of the container as long as there is any liquid therein and may be removed at any time by grasping the spout and lifting it upwardly to free the fingers 20 from engagement with the container.

The spout above described is of special use as an attachment for buckets used to collect turpentine, maple syrup and other saps and is also convenient as a home utensil for attachment to pails, pans and other containers for filling bottles or jars. These spouts may be made of various sizes to fit them for vessels of different diameters, and be furnished with or without the extension 14 if so desired, the latter being rigidly secured on the end of the spout or made removable as may be most convenient. The spout may also vary in length and in width, the proportions depending on the uses to which the spout is to be put.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

An attachable spout comprising a flattened tapering body portion, oppositely extending end flanges on the wide end of said body portion, a flange on the side of said body portion adjacent the end thereof, a plate secured to said side flange, and a pair of resilient strips formed on the ends of said plate, bent upon themselves and formed with a rolled portion at the point of flexure to fit around the bead on the rim of a bucket.

In testimony whereof I affix my signature in presence of two witnesses.

FREDERICK FROMHAGEN.

Witnesses:
   JOHN E. BURCH,
   IDA WOLFF.